United States Patent [19]

Bogdanski

[11] Patent Number: 4,803,583
[45] Date of Patent: Feb. 7, 1989

[54] CLEANING CASSETTE WITH AN INTERNAL DRIVE MOTOR

[75] Inventor: Michael Bogdanski, Salzkotten, Fed. Rep. of Germany

[73] Assignee: Nixdorf Computer AG, Paderborn, Fed. Rep. of Germany

[21] Appl. No.: 39,558

[22] Filed: Apr. 16, 1987

[30] Foreign Application Priority Data

Apr. 21, 1986 [DE] Fed. Rep. of Germany ... 8610911[U]

[51] Int. Cl.[4] .................... G11B 5/10; G11B 5/127; G11B 5/41
[52] U.S. Cl. .................... 360/128; 360/137
[58] Field of Search ............ 360/128, 137; 15/210 R, 15/DIG. 12, DIG. 13; 206/387

[56] References Cited

U.S. PATENT DOCUMENTS

| | | | |
|---|---|---|---|
| 3,997,919 | 12/1976 | Thompson | 360/128 |
| 4,272,796 | 6/1981 | Van Kreuningen et al. | 360/128 |
| 4,454,551 | 6/1984 | Clausen et al. | 360/128 |
| 4,458,281 | 7/1984 | Kara | 360/128 |
| 4,622,605 | 11/1986 | Tsuruoka et al. | 360/94 |
| 4,631,614 | 12/1986 | Davis et al. | 15/210 R X |
| 4,631,615 | 12/1986 | Grossman et al. | 360/128 |

FOREIGN PATENT DOCUMENTS

0198318 10/1986 European Pat. Off. ............ 360/128

OTHER PUBLICATIONS

"¼ Streamer Cassette Tape Cleaner", Nixdorf Computer, No. 13354.00.3.93, Dec. 1985.

Primary Examiner—Stuart N. Hecker
Assistant Examiner—David J. Severin
Attorney, Agent, or Firm—Cullen, Sloman, Cantor, Grauer, Scott & Rutherford

[57] ABSTRACT

In a cleaning cassette for cleaning an electromagnetic transducer head of a cassette tape deck, having a cassette housing capable of being inserted in the cassette receptacle of the deck, a cleaning head movably mounted in the cassette housing, and a drive system coupled to the cleaning head, the drive system comprising a drive motor (52, 152) arranged inside the cassette housing (2, 102) and mechanically linked to the cleaning head (22, 122).

22 Claims, 2 Drawing Sheets

CLEANING CASSETTE WITH AN INTERNAL DRIVE MOTOR

TECHNICAL FIELD

The present invention relates to a cleaning cassette for cleaning an electromagnetic transducer head, and deals more particularly with a cleaning cassette which includes a moveable cleaning head and a motor for driving the cleaning head.

BACKGROUND OF THE INVENTION

The electromagnetic transducer heads of cassette tape decks, namely the recording, playback and erasing heads, must be cleaned from time to time, because dirt is deposited on them during operation of the deck.

There are known cleaning cassettes that contain a cleaning tape, instead of a magnetic tape, driven by the mechanisms of the deck and guided along the heads. The wiping direction is thus fixed in the direction of travel of the tape, so that there is danger that gaps and steps in the surface to be cleaned that extend transverse to the directino of travel may not be adequately cleaned. Another disadvantage is that the cleaning tape is handled by the tape handling system of the tape deck. During ordinary operation of the cassette tape deck, tape travel is interrupted when the magnetic tape transmits a undefined signal. Since the cleaning tape does not carry any signal information, generally the handling system will not operate and hence will not drive the cleaning tape. In such cases, therefore, a special cleaning program must be provided for, with consequent inconvenience and added cost.

Also known are cleaning cassettes that contain a special movably mounted cleaning head connected to a drive means independent of the mechanisms of the tape deck. A brochure identified as "Order No. 13 354.00.3.93" from the company Nixdorf Computer AG, Paderborn, West Germany shows a cleaning cassette having a cleaning head pivoted in such a way that the working surface facing the transducer head moves transverse to the direction of tape travel. The cleaning head is urged in one direction of motion by a spring and can be moved manually against the action of the spring by means of an operating lever connected to the cleaning head.

A substantial disadvantage of this known cleaning cassette is that it can be used only for tape decks in which the cleaning cassette, and specifically the actuating lever, remain accessible after insertion in the cassette receptacle. Hence, the known cleaning cassette cannot be used, for example, in any tape decks where the cassette receptacle is closed by a lid after insertion of a cassette. The same applies to tape decks in which the cassette is inserted lengthwise. Another disadvantage is that the manual cleaning operation is difficult and laborious for the operator, and that the extent of cleaning depends on the operator's diligence.

The object of the present invention is to provide an improved cleaning cassette which can be operated independently of the configuration of the cassette receptacle, so that the cleaning operation can be carried out automatically.

SUMMARY OF THE INVENTION

The drive system comprises a motor specially provided to actuate the cleaning head and likewise arranged inside the cassette housing. No manual actuation of the cleaning head, nor any accessibility of the cleaning cassette after insertion in the receptacle of the deck, is thus required. Further, the cleaning operation using the cassette according to the invention may be rendered completely automatic and hence is independent of the skill of the particular operator.

The motor may be of any design such as a linear oscillating system, for example. In a preferred embodiment of the invention, however, the motor is an electric motor with a rotating output shaft. Such motors are available as inexpensive commercial components in a wide range of output ratings.

With a cleaning head in the form of a rotatable cleaning roller, a direct coupling may be provided between the drive motor and the cleaning head. If the motor is of an oscillating type, the cleaning head is coupled to the motor by way of a transmission. The transmission has a rotating input shaft connected to the drive motor and an oscillating transmission lever connected to the cleaning head; the components placed between the input shaft and the transmission lever to convert the rotary motion into reciprocating motion may be of any desired type.

In one embodiment of the invention, for example, the transmission comprises a cam disk rotatively connected to the output shaft of the motor, and the free end of the transmission lever rests on the flanks of the cam disk. The parts required for a transmission of this kind may be very simple and inexpensive in terms of manufacture and assembly.

In a preferred embodiment of the invention, the cassette housing has a floor with walls and partitions more or less perpendicular thereto, and the cleaning head is comprised of a plate arranged in a central position more or less parallel to the floor of the housing and is capable of oscillating about an axis parallel to the floor of the housing. Provision is made for the cam disk to have an axis perpendicular to the floor of the housing, for the cam prominences to consist of an annular rim on the side of the disk away from the floor of the housing with cam flanks ascending the descending in circumferential direction, for a transmission lever parallel to the floor of the housing to be fixedly connected to the cleaning head, and for the cleaning head to be engaged by a spring action upon the transmission lever in the direction of contact. The spring holds the transmission lever constantly in contact with the cam track.

Upon rotation of the cam disk, the transmission lever follows the contour of the track and impresses oscillating motion upon the cleaning head. The cam disk is coupled to the drive motor, according to the invention, by face teeth surrounding the annular ring radially on the outside, which are engaged by a drive pinion connected to the output shaft of the motor.

In the cassette housing, according to the invention, an electric sensor switch is arranged with its sensor protruding into the path of a prominence on the cam disk. The switch is actuated by the revolving prominence, serving, for example, to switch off the drive motor after one revolution of the cam disk.

In a further refinement of the invention, it is proposed that in the cassette housing, a cleaning roller is driven communication with the cam disk and likewise having an axis of rotation perpendicular to the floor of the housing be provided, a portion of its periphery projecting beyond one of the outside walls of the housing. This cleaning roller may serve to clean other parts of the mechanisms of the tape deck, in particular the capstan roller, as will be described later in more detail.

In another embodiment of the invention, wherein the cleaning head is in the form of an oscillating plate, provision is made for the drive motor to have a cranked output shaft more or less parallel to the floor of the housing, which shaft is connected to the cleaning head by way of a link acting perpendicular to the floor of the housing. An especially simple design results if the output shaft of the drive motor is more or less parallel to the axis of oscillation of the cleaning head, and a transmission lever perpendicular to such axis and more or less parallel to the plane of the plate-like cleaning head is fixed to the latter, the cranked end of the output shaft being engaged in a slot in the transmission lever, extending parallel to the orientation of the latter. The component perpendicular to the floor of the cassette of the circular motion of the cranked end is transmitted to the lever and by the latter to the cleaning head. To control the cleaning operation, according to the invention, a sensor switch is arranged in the cassette housing, its movable sensor protruding into the path of a projection connected to the cleaning head. This projection preferably consists of the free end of the transmission lever. A counter counts the number of switch actuations, corresponding to the oscillations of the transmission lever, and for example switches the drive motor off after a preassigned number of oscillations, as will be described later.

The drive motor may for example be connected by way of contacts provided on the cassette housing and leading to the outside, to a source of current outside of the cassette housing, for example in the tape deck. In a preferred embodiment of the invention, however, a receptacle for at least one electric battery is provided in the cassette housing with contacts to serve as a source of energy for the drive motor and optionally also for a counter. In this manner, the cleaning cassette will be completely independent.

The cassette housing is preferably divided into compartments by means of partitions, so that for example the cleaning head, the drive system, controls for the drive system, or the batteries may each be disposed in separate compartments, as will be described later in more detail.

To activate the drive system, according to the invention, in or on at least one outside wall of the cassette housing, an electric switch is arranged, with an actuating member extending outward, the actuating member being actuated when the cleaning cassette is inserted, and connecting the supply of current to the drive motor. The drive motor is switched off in the manner previously described by separate switches actuated by parts of the cleaning system in motion during the cleaning operation.

The working surface of the cleaning head, facing the transducer head, is provided in a conventional manner with means for attaching a facing strip of a sponge or cloth-like matrial. Before inserting the cleaning cassette in the deck, this may be impregnated with a cleaning fluid. According to the invention, the cleaning roller for cleaning the capstan roller or other parts of the mechanical system may be fitted with an annular facing of more or less sponge or cloth-like material as well. To house the facing strips or rigs, according to the invention, a special compartent is provided in the cassette housing. Since the transducer head commonly requires cleaning more often than the other mechanisms, this compartment is arranged to accommodate one annular facing and several strip facings, proportionally to their use.

Several embodiments of the invention are represented by way of example in the drawings and will be described below in more detail.

DESCRIPTION OF THE PREFERRED EMBODIMENTS OF THE INVENTION

Figure 1:
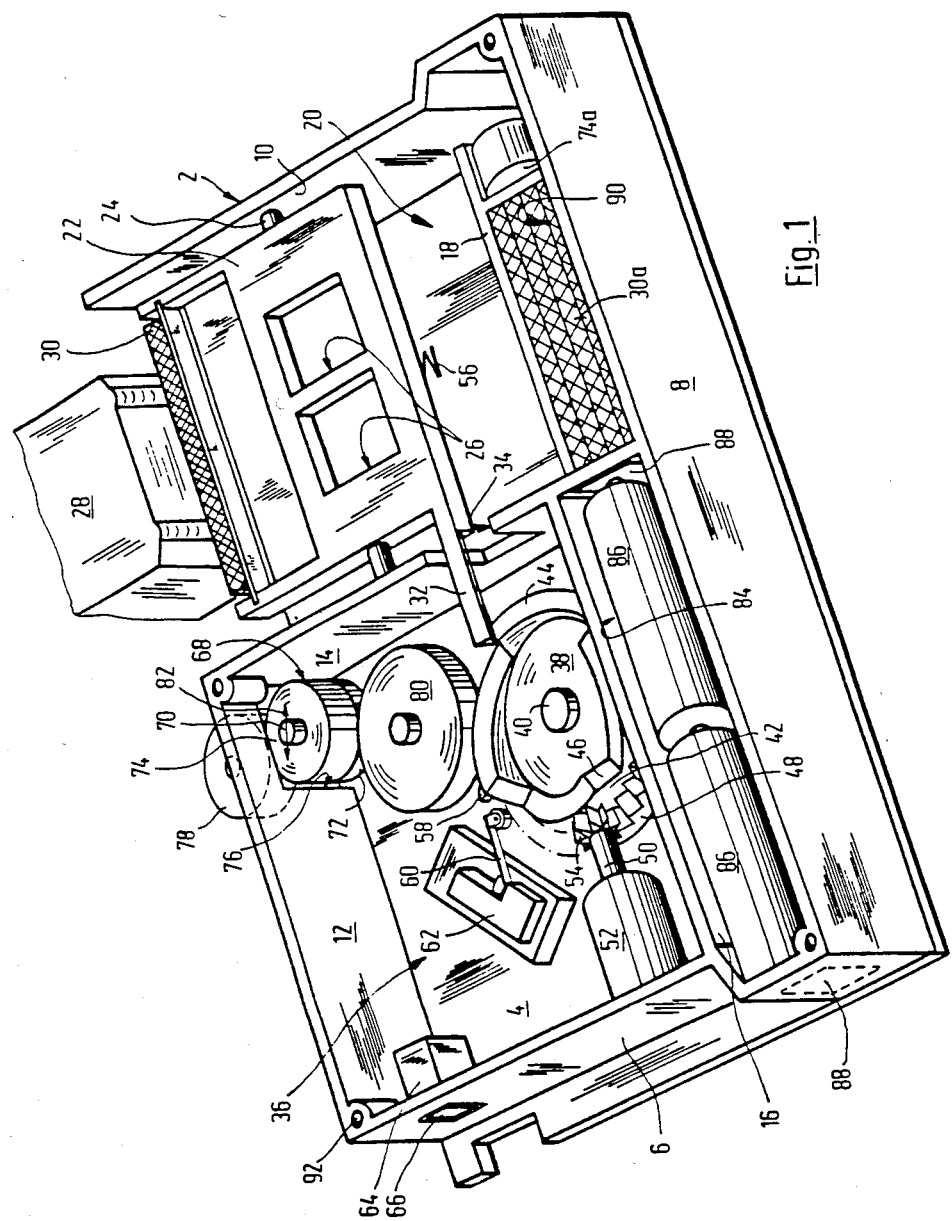
FIG. 1 shows a cleaning cassette having an oscillating cleaning head driven by way of a cam disk.

FIG. 1 shows a cassette housing 2 having the outside dimensions of a standard tape cassette. On the floor 4 of the cassette, vertical outside walls 6, 8, 10, 12 and partitions 14, 16, 18 are disposed. These partitions 14, 16, 18 form separate compartments in the cassette.

In a first compartment 20, a cleaning head 22 is accommodated. This consists of a plate, more or less parallel in a central position with the floor 4 of the housing, and capable of oscillating about a pivot 24 parallel to the floor of the housing. Pivots 24 are lodged at one end in the outside wall 10 and at the other end in the partition 14. The cleaning head 22 is provided with openings 26 to save weight. At the end towards the electromagnetic transducer head 28, the cleaning head 22 icludes means for accepting an absorbent material which may comprise a more or less sponge or cloth-like facing strip 30. This facing strip may for example have a fleece-like texture. Before the cleaning operation, it may be impregnated with a special cleaning fluid.

At the end of the cleaning head 22 away from the transducer head 28, a transmission lever 32 is provided. This protrudes through an opening 34 in the partition 14 into a second compartment 36.

In the second compartment 36, a cam disk 38 is rotatably mounted on a shaft 40 perpendicular to the floor 4 of the housing. On the face of the cam disk 18 away from the floor of the housing, an annular rim 42 is formed, with ascending cam flanks 44 and descending cam flanks 46 in a circumferential direction. The rim 42 is encircled radially on the outside by face teeth 48 meshing with a drive pinion 54 connected to the output shaft 50 of a drive motor 52. The transmission lever 32 rests on the flanks 44, 46 of the cam rim 42 and is kept in constant contact with the cam flanks 44, 46 by a spring 56.

On the outer periphery of the cam disk 38, a prominence 58 is formed, actuating the feeler 60 of a switch 62.

In the outside wall 6, an electric switch 64 with actuating member 66 directed outward is provided. Another switch, not shown, may be arranged in the outside wall 8.

When the cleaning cassette 2 is inserted in the cassette receptacle of a tape deck, the switch 64 is actuated by the user, or for example by a matching surface in the receptacle. This supplied current to the drive motor 52, so that it drives the cam disk by way of the pinion 54.

The transmission lever 32 resting on the cam flanks 44, 46 moves up and down and produces an oscillation of the cleaning head 22 about the axis 24. After one revolution of the cam disk 38, the feeler 60 of switch 62 is actuated by the prominence 58, switching off the supply of current to the drive motor 52. The prominence 58 is so arranged that the cam disk 38 will come to a stop in a position where the transmission lever 32 occupies more or less a central position, so that the end of the cleaning head 22 facing the transducer head 28 with facing strip 30 will likewise be more or less in central position. Thus, when the cleaning cassette 2 is inserted in the receptacle of the tape deck, any dirt on the top or bottom of the cassette receptacle will not get on the facing strip 30.

In the cassette housing 2, a cleaning roller 68 is arranged, with shaft 70 perpendiculr to the floor 4. The cleaning roller 68 comprises a hub 72, on which a facing ring 74 of the sponge or cloth-like material may be placed. A portion of the periphery of the cleaning roller 68 protrudes through an opening 76 in the wall 12 beyond the wall, and serves for example to clean a capstan roller 78 mounted in the tape deck. The hub 72 is in frictional engagement with an intermediate roller 80, which in turn is in friction contact with an outer cylindrical surface of the cam disk 38.

As may be seen in FIG. 1, the shaft 70 may be arranged so as to be displaceable in the direction of the arrow 82, that is, more or less tangentially to the periphery of the intermediate roller 80, at least by a small amount, and may be connected to a switch in a manner not shown. When the cassette housing 2 is placed in the cassette receptacle, contact of the cleaning roller 68 with the capstan roller 78 will displace the shaft 70 and actuate the switch associated with it, thus activating the drive motor 52. In that case, the switches 64 may be dispensed with.

The cassette housing 2, besides the compartments 20 and 36, has a third compartment 84 to accommodate batteries 86. In compartment 84, contacts 88 are provided, connected to the switch arrangement containing the aforesaid switches and to the drive motor 52.

In addition, the cassette housing 2 has compartments 90 to accommodate several spare facing strips 30a and a spare facing ring 74a. Experience indicates that in the time one facing ring 74 is used up, about five facing strips 30 will be required. The compartments for spare facing strips and facing rings are therefore dimensioned accordingly. They may optionally be dimensioned otherwise.

The cassette housing 2 may be closed in known manner with a cassette cover, not shown, to be attached to the cassette housing 2 by means of screws entering into threaded holes 92.

Figure 2:
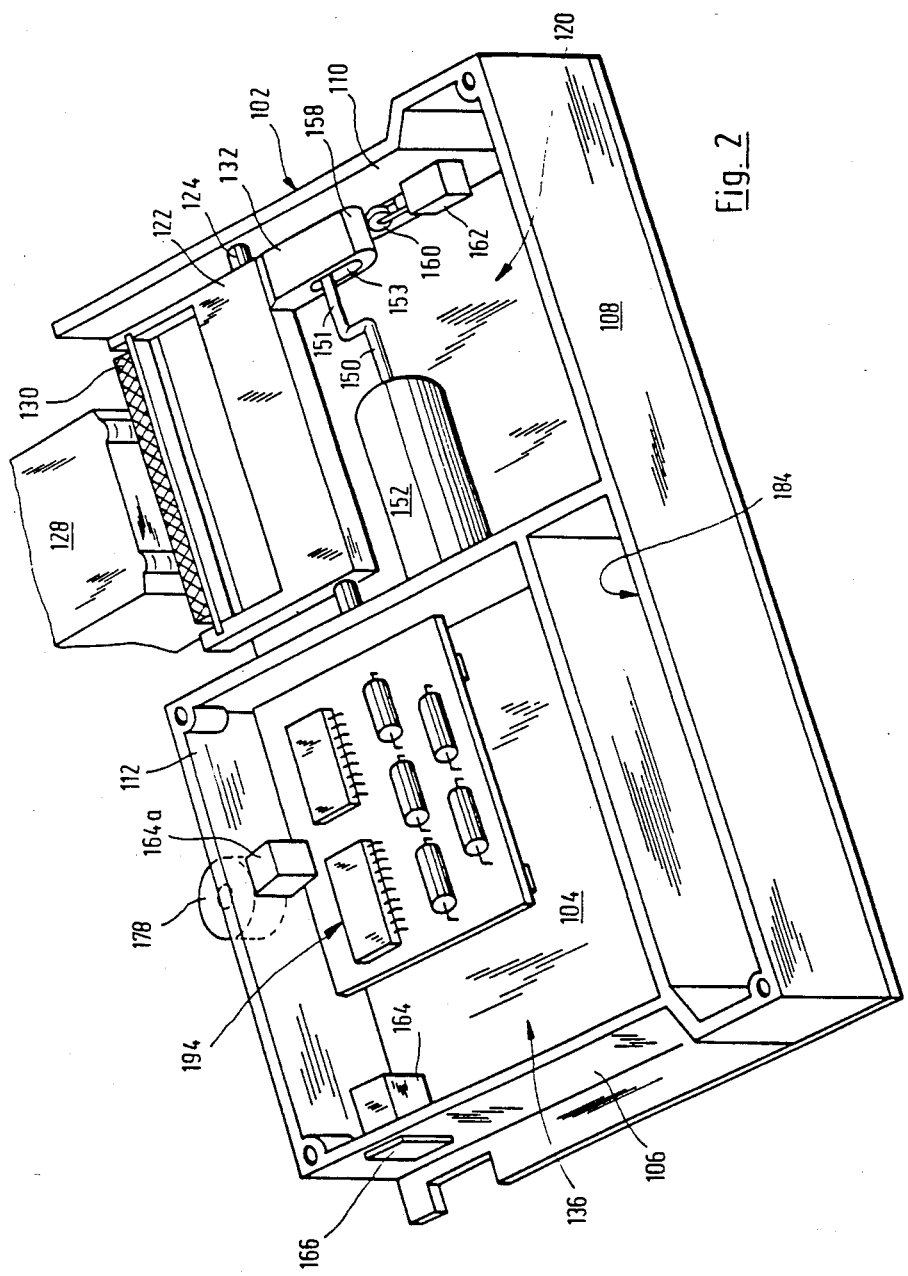
FIG. 2 shows a cleaning cassette having an oscillating cleaning head driven by way of a crank.

FIG. 2 shows a cassette housing 102 of much the same kind as shown in FIG. 1; walls 106, 108, 110, 112 perpendicular to the floor 104 of the housing form a plurality of compartments 120, 136, 184.

In the first compartment 120, a cleaning head 122 is mounted to oscillate about an axis 124 and bears a facing strip 130 to clean an electromagnetic transducer head 128. A drive motor 152 is likewise arranged in the first compartment 120. It has an output shaft 150 more or less parallel to the floor 104 and cranked at the end. At the end of the cleaning head 122 away from the transducer head 128, a transmission lever 132 is arranged, more or less perpendicular to the axis of oscillation 124. The free end 151 of the cranked output shaft 150 enters a lengthwise slot 153 in the transmission lever 132. When the drive motor 152 is activated and the output shaft 150 rotates, it produces an oscillatory motion of the cleaning head 122.

Likewise in the first compartment 120, a feeler switch 162 is arranged with its moveable feeler 160 cooperating with the free end of the transmission lever 132. At each oscillation, the feeler 160 is actuated, generating a counterpulse. These pulses are supplied to a control circuit 194 arranged in the second compartment 136, which control circuit interrupts the supply of current to the drive motor 152 after a preassigned number of movements of the cleaning head 122. The control circuit 194 may alternatively contain a timing element, maintaining the actuation of the drive motor for a definite preassigned period of time. In addition, the control circuit 194 may include an acoustic signaling means notifying the operator that the cleaning operation has been completed.

In the outside 106, a switch 164 with switching member 166 directed outward is arranged. The switching member 166 may, as previously described with reference to FIG. 1, be actuated by the user, for example before inserting the cleaning cassette in the receptacle of the tape deck, thus activating the drive motor 152. Such switches may be arranged in any desired number in any desired suitable location on the outside walls or the floor 104 of the cassette. In a preferred embodiment, another switch 164a equipped with a capstan roller sensor (not shown) is arranged at the point on the outside wall 112 facing a capstan roller 178 arranged in the tape deck.

The relative arrangement of the capston roller 78, 178 and the transducer head 28, 128 is standardized in nearly all cassette tape decks accepting a given type of cassette, so that the capstan roller 78 or 178 may serve to actuate the switch connected to the shaft 70 of the cleaning roller 68 or the switch 164a and thereby activate the drive motor 52 or 152.

The drive motors 52, 152 are preferably gear motors having a comparatively low output speed. The control circuit 194 is so designed that the drive motor 152 is stopped after completion of the cleaning operation in response to the actuation of the feeler switch 122 in a manner such that the end of the cleaning head 122 bearing the facing strip 130 will occupy its central position, to prevent dirt from being deposited on the facing strip 130 when the cassette housing 102 is placed in the cassette receptacle of the tape deck, as previously described with reference to FIG. 1.

What is claimed is:

1. An improved cleaning cassette for cleaning an electromagnetic transducer head of a cassette tape deck, and of the type having a cassette housing capable of being inserted in the cassette receptacle of the deck, a cleaning head movably mounted in the cassette housing, and a drive system coupled to the cleaning head for moving the cleaning head relative to the transducer head, wherein the improvement comprises:

said drive system including a drive motor (52, 152) arranged inside the cassette housing (2, 102) and drivingly connected with the cleaning head (22, 122); and means for mounting the cleaning head on said cassette housing for oscillating movement relative to said transducer head.

2. An improved cleaning cassette according to claim 1, wherein the cassette housing (2, 102) includes at least one outside wall (6, 8, 106, 108, 112) and the improvement further comprises an electric switch (64, 164, 164a) for activating said drive system and having an actuating member (66, 166) extending through one of the outside walls (6, 8, 106, 108, 112), so as to be accessible from the exterior of the cassette housing (2, 102).

3. An improved cleaning cassette according to claim 1, wherein the improvement further comprises a sensor (164a) carried by the cassette for sensing the capstan roller of the cassette deck and a switch responsive to the sensor (164a) for activating the drive system.

4. An improved cleaning cassette according to claim 1, wherein the improvement further comprises a cleaning roller (68) adapted to engage the capstan roller (78) of the cassette deck and rotatably mounted on the cassette by means of a shaft (70), the shaft being shiftably mounted on the cassette to allow displacement of the cleaning roller (68) relative to the cassette upon engagement within the capstan roller (78), and a switch responsive to the displacement of the cleaning roller (68) for activating the drive system.

5. An improved cleaning cassette according to claim 1, wherein the drive motor (52, 152) is an electric motor.

6. An improved cleaning cassette according to claim 5, wherein the improvement further comprises means in said cassette housing (102) for holding and electrically contacting at least one electrical battery (86).

7. An improved cleaning cassette according to claim 1, wherein the drive motor (52, 152) has a rotating output shaft, and there is further provided transmission means including a rotating input member (54, 150) connected to the drive motor and an oscillating transmission lever (32, 132) connected to the cleaning head (22, 122).

8. An improved cleaning cassette according to claim 7 wherein the cassette housing (102) includes first and second compartments separated from each other by partitions arranged in the cassette housing, the cleaning head being disposed in the first engagement, the drive system being disposed in the second compartment (36) and adjoining the first compartment (20), and wherein a opening (34) is provided in one of the partitions (14) which separates the first compartment (20) from the second compartment (36), the transmission lever (32) protruding through the opening.

9. An improved cleaning cassette according to claim 8, wherein the improvement further comprises an electronic control system (194), at least one battery (86), and third and fourth compartments (136, 84, 184), the drive system (152, 150, 151, 132) being disposed in the first compartment (120), the electronic control system (194) being disposed in the third compartment (136) and the battery (86) being disposed in the fourth compartment (84).

10. An improved cleaning cassette according to claim 7, wherein the cassette housing comprises a floor and outside walls and partitions essentially perpendicular thereto, and wherein the cleaning head includes a plate capable of oscillating about an axis parallel to the floor of the housing, the plate extending essentially parallel to the floor of the housing when it is in a central position of oscillation, the improvement further comprising the drive motor (152) having a crank shaped rotating output shaft (150) generally parallel to the floor (104) of the housing and connected to the cleaning head (122) by a mechanical link acting perpendicular to the floor (104) of the housing.

11. An improved cleaning cassette according to claim 10, wherein the output shaft (150) of the drive motor (152) is generally parallel to the axis of oscillation (124) of the cleaning head (122), the transmission lever (132) extends generally perpendicualr to the axis of oscillation (124) and generally parallel to the plane of the plate, the transmission lever (132) is fixedly attached to the cleaning head (122) and includes a slot (153) therein extending parallel to the longitudinal axis of the transmission lever (132), and the output shaft (150) includes a cranked end (151) engaging the slot (153) in the transmission lever (132).

12. An improved cleaning cassette according to claim 10, wherein the improvement further comprises a projection (158) connected with the cleaning head (122) and a sensor switch (162) in the cassette housing (102) having a moveable sensor (160) protruding into the path of the engageable with the projection (158).

13. The improved cleaning cassette according to claim 12, wherein the projection (158) is defined by at least a portion of said transmission lever (132).

14. An improved cleaning cassette according to claim 7, wherein the transmission means comprises a cam disk (38) rotationally connected with the output shaft (50) of the drive motor (52), and said cam disk (38) is provided with cam flakes (44, 46), the free end of the transmission lever (32) resting on the cam flanks (44, 46) of the cam disk.

15. An improved cleaning cassette according to claim 14, wherein the improvement further includes a prominence (58) formed on the cam disk (38) and an electric sensor switch (62) disposed within said cassette housing (2) and having a sensor (60) protruding into the path of the prominence (58), the prominence (58) being essentially disposed on the outer periphery of the cam disk (38), the sensor switch (62) being mounted adjacent the cam disk (38) on the floor (4) of the housing, with the sensor (60) being moveable in a direction essentially parallel to the floor (4).

16. An improved cleaning cassette according to claim 15, wherein the sensor switch (62, 162) is positioned such that the drive motor (52, 152), after actuation, of the sensor switch (62, 162), comes to a stop at a point where the cleaning head (22, 122) occupies a central position.

17. An improved cleaning cassette according to claim 14, wherein the cassette housing has a floor (4) and outside walls and partitions generally perpendicular thereto and wherein the cleaning head is defined by a plate capable of oscillating about an axis parallel to the floor and is arranged generally parallel to the floor in a central position, the cam disk (38) having a shaft extending (40) perpendicular to the floor (4) of the housing and an annular rim (42) on the face of the cam disk (38) away from the floor of the housing with flanks (44, 46) ascending and descending in circumferential direction of the cam cisk (38), and wherein the improvement further comprises a transmission lever (32) extending essentially parallel to the floor (4) of the housing and fixedly connected to the cleaning head (22), and a spring (56) urging the cleaning head (22) to move relative to the transducer head.

18. An improved cleaning cassette according to claim 17, wherein the cam disk (38) has teeth (48) encircling the annular rim (42) and meshingly engaging a drive pinion (54) connected to the output shaft (50) of the drive motor.

19. An improved cleaning cassette according to claim 17, wherein the improvement further comprises a cleaning roller (68) in the cassette housing (2), said cleaning roller (68) having a rotational shaft (70) extending perpendicular to the floor (4) of the housing and mechanically connected to the cam disk (38), a portion of the periphery of the cleaning roller (68) projecting beyond one of the outside walls.

20. An improved cleaning cassette according to claim 19, wherein the improvement further comprises an intermediate roller (80), and the cleaning roller (68) is mechanically connected with the intermediate roller (80), and the intermediate roller (80) is mechanically connected with the cam disk (38).

21. An improved cleaning cassette according to claim 19, wherein the cleaning roller (68) comprises a hub (72) and a facing ring (74) of a generally absorbent material.

22. An improved cleaning cassette according to claim 21 wherein the cleaning head has a working surface facing the transducer head and is provided with means for attaching a facing strip of an absorbent material, the cassette housing (2) including a separate compartment for accommodating at least one facing strip (30a) and a facing ring (74a).

* * * * *